No. 795,949. PATENTED AUG. 1, 1905.
J. P. WRIGHT.
BOX SHUCK MAKING MACHINE.
APPLICATION FILED JULY 18, 1900.

Witnesses:
Jas. E. Hutchinson.
Henry C. Hazard

Inventor.
Jacob P. Wright, by
Grinnell and Russell, his attys.

UNITED STATES PATENT OFFICE.

JACOB P. WRIGHT, OF NEW HAVEN, CONNECTICUT, ASSIGNOR TO THE DIAMOND MATCH COMPANY, OF CHICAGO, ILLINOIS, A CORPORATION OF ILLINOIS.

BOX-SHUCK-MAKING MACHINE.

No. 795,949.      Specification of Letters Patent.      Patented Aug. 1, 1905.

Application filed July 18, 1900. Serial No. 24,101.

*To all whom it may concern:*

Be it known that I, JACOB P. WRIGHT, of New Haven, in the county of New Haven, and in the State of Connecticut, have invented certain new and useful Improvements in Box-Shuck-Making Machines; and I do hereby declare that the following is a full, clear, and exact description thereof, reference being had to the accompanying drawings, in which—

Letters of like name and kind refer to like parts in each of the figures.

The object of my invention is to provide an improved machine for making tube-form box parts; and to such end said invention consists in the machine and in the parts thereof constructed substantially as hereinafter specified.

Figure 1:
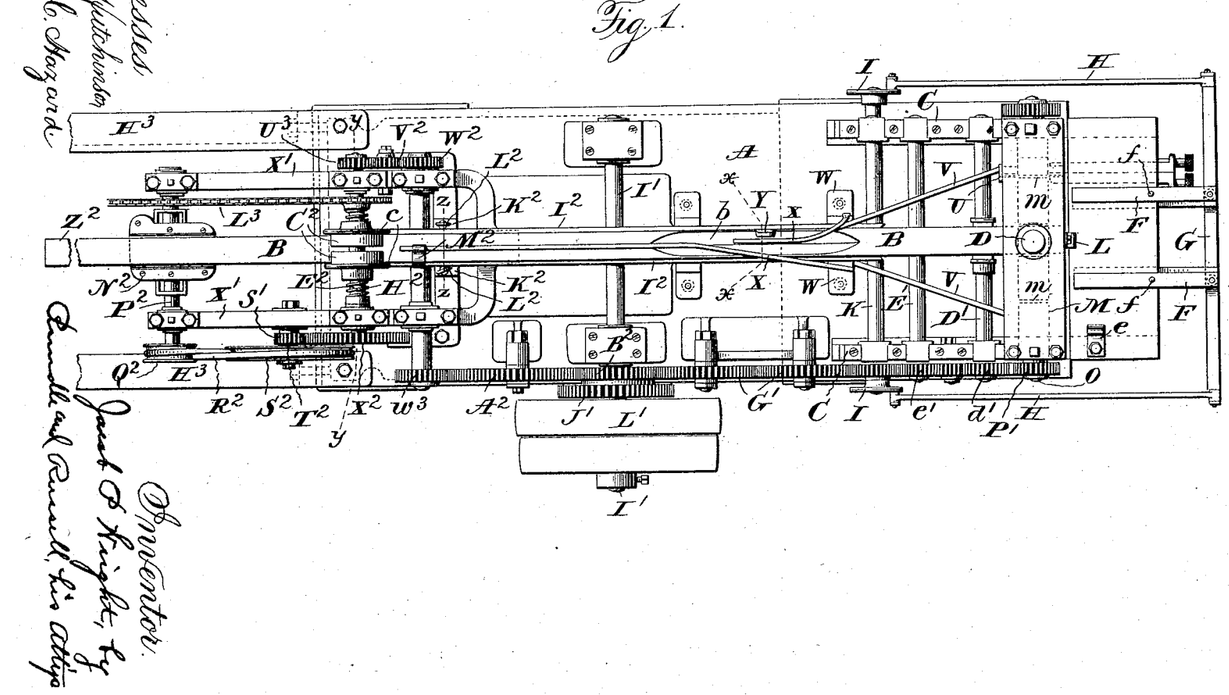
Figure 1 is a top plan view of a shuck-machine embodying my invention.
Figure 2:
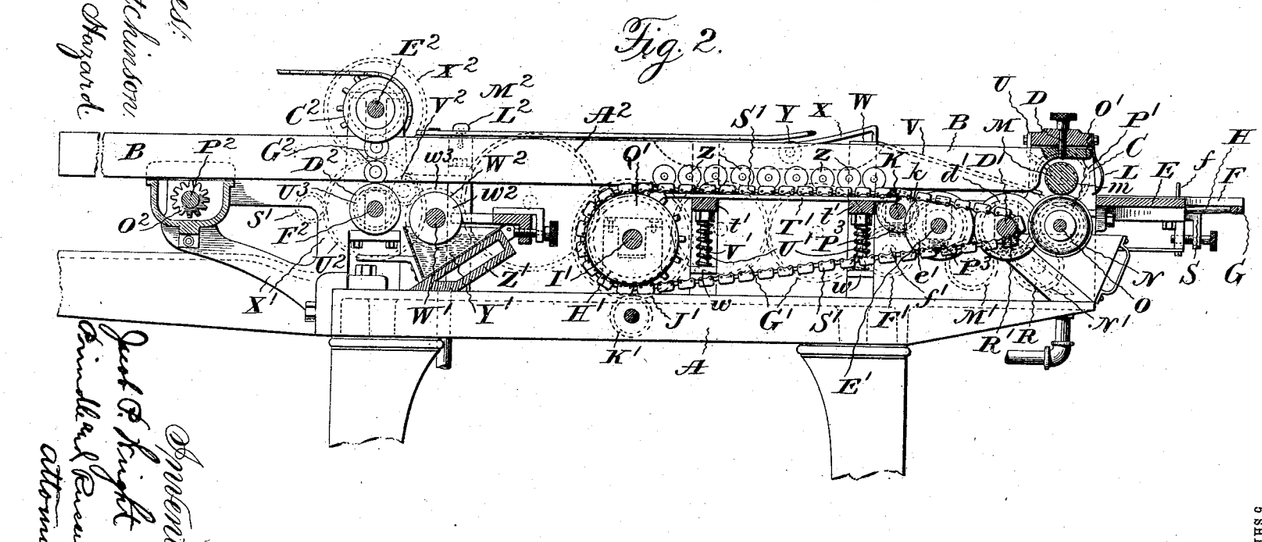
Fig. 2 is a vertical longitudinal section thereof.
Figures 8, 9, 10, 11:
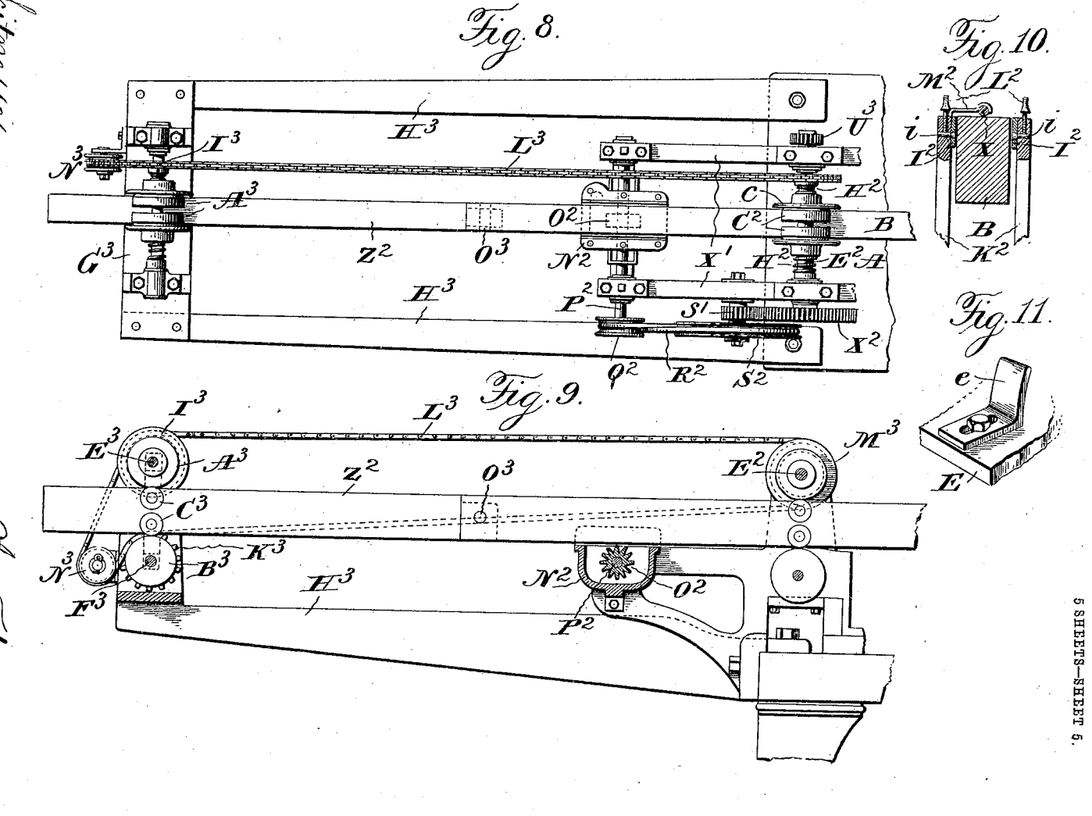
Fig. 8 is a top plan view of an extension device which may be employed when it shall be desirable to subject the shuck to supplemental pressure.
Fig. 9 is a vertical longitudinal section of the same.
Fig. 10 is a detail view in cross-section on line $z\ z$ of Fig. 1.
Fig. 11 is a detail view in perspective of the blank guide or gage.

My invention pertains to machines of the class in which a bar or mandrel is employed, about which a blank is folded, and along which it is moved while being subjected to the operations required to produce the finished shuck, and in the embodiment of the invention illustrated a base or table A is employed, above and parallel with which a mandrel B is supported, whose contour in cross-section is that of an oblong, it being designed for the manufacture of a box part or shuck that has the form in cross-section of an oblong flat-sided tube. At the end of the table A which is the front of the machine there is a frame or housing C, composed of two vertical side walls, and a cross-bar bolted to the top of the side walls, and beneath said cross-bar one end of the mandrel B extends and is secured by a vertical pin D, that passes through an opening in the cross-bar into one in the mandrel. Projecting horizontally in front of the frame or housing C is a table or platform E, whose upper side is in line with the under side of the mandrel B, upon which the box-part blank in the form of a rectangular sheet is placed for feeding into the machine. At one side of said platform is a gage $e$, against which one edge of the blank is placed and which has its blank-engaging surface curved concavely or arched, so that it will overhang the blank and should the latter be warped or buckled will facilitate its being straightened by preventing it rising from the platform at the side adjacent to the gage. A pair of reciprocable bars F and F, mounted in guides in the platform and having, respectively, studs or pins $f$ and $f$ on their upper sides to engage the rear edge of the blank, moves the blank forward. Said bars are connected at their rear ends to a cross bar or head G, whose opposite ends are respectively connected by pitmen H and H to crank-disks I and I on a shaft K, journaled in bearings on the frame C, to which shaft motion is imparted by the means hereinafter described. To cause the blank to squarely engage both feed-bar pins $f$ and $f$, and thus insure its being fed in proper position, a spring-finger L is attached to the housing cross-bar with its free end depending in position to engage the forward edge of the blank to press the latter back against the pins, if not already there, and then yield before the same when pressed onward by the pins.

Mounted on the frame C are scoring devices comprising an upper roll M, having four annular grooves $m$ and $m$ and four thin scorers N and N, carried by a shaft O, below the roll M, the scorers being respectively opposite the grooves $m$ and $m$ and each coöperating with one of the latter to score or crease the blank preparatory to being folded. The scorers are in the form of rings, three of which are respectively attached to collars $n$ and $n$ on the shaft O, and the remaining one is attached to a glue-wheel P for applying the glue to the blank to unite the overlapped edges thereof. The glue-wheel revolves through glue in a pot Q below it, that rests on a heater R, attached to the table A. The bottom of the pot is inclined, so that the pot is wedge-shaped, and the surface of the heater on which the bottom rests is correspondingly inclined. As a result of the inclination of the bottom of the pot it can readily be slid in or withdrawn from position beneath the glue-wheel without the removal or shifting of any adjacent parts notwithstanding the glue-wheel projects down into the pot. With a pot having a horizontal bottom direct vertical movement of the pot is necessary, and this cannot be had without removal or shifting of adjacent parts because of the contracted space for the pot.

For removing excess of glue from the glue-wheel there is, as usual, a scraper S in the form of a bar with an end notched to act on one side and the periphery of the glue-wheel, and to clear glue from the scorer that is attached to the glue-wheel there is a scraper T, also consisting of a bar having an end notched to conform to the periphery of the scorer and overlap the outer side thereof. A scraper U is provided for the removal from the upper scorer-roll M of any glue which may be deposited thereon.

Figures 5, 6, 7:
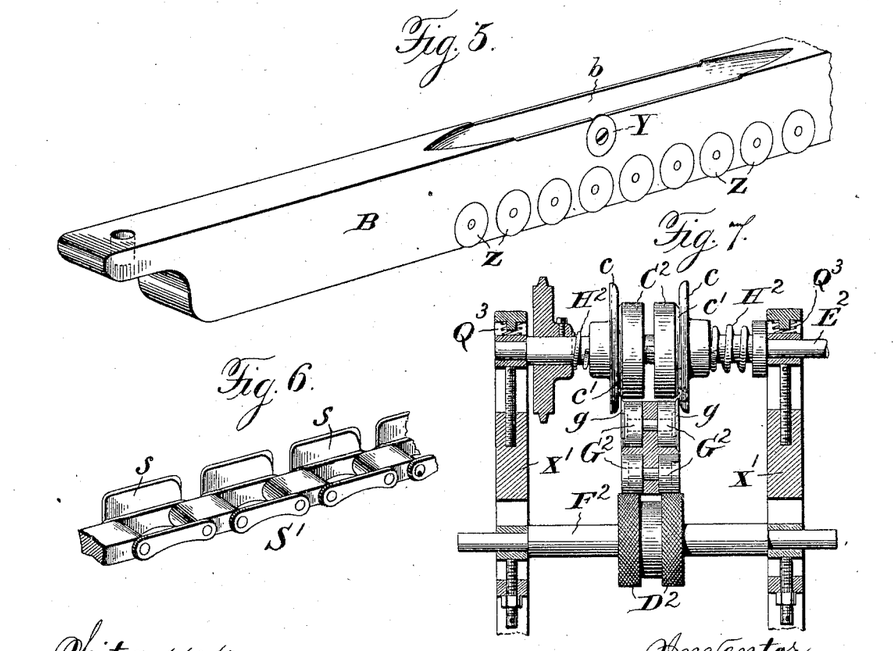
Fig. 5 is a detail view in perspective of the forward portion of the mandrel.
Fig. 6 is a like view of a portion of one of the shuck-moving chains which coöperate with said mandrel.
Fig. 7 is a cross-section on the line $y\ y$ of Fig. 1.

On opposite sides of the mandrel there are two similar rods or bars V and V, whose forward ends are free and are located at a point slightly below the bottom of the mandrel and in advance of the front end of the bottom and which thence incline upward and inward until they reach close to the mandrel at or near the top thereof, where they are fastened to standards W and W, which are bolted to the table A and rise therefrom on opposite sides of the mandrel. The blank leaving the scorers encounters the forward ends of the rods, and passing onward with its middle portion beneath and engaging the mandrel its two opposite side portions are gradually raised and pressed inward against the mandrel by the rods with the portions that are to form the laps projecting above the mandrel. Other rods X and X, attached at their forward ends to the standards W and W, incline, respectively, from planes above and to one side of the mandrel inward and downward, but at different angles, so that they will successively engage the two projecting side portions of the blank and bend them down one after the other to the top of the mandrel, the one with glue being turned down first and the other following close after and being pressed against the glued upper surface of the former. Beneath the rods X and X the mandrel has a cavity or recess $b$ in its upper side which is of such extent in cross-section as to leave but a thin edge at each of the upper corners of the mandrel. The lowest portion of the inside lap-folding rod X is in such position that it will press the inside lap slightly down into the cavity over the thin edge of the mandrel, and thereby form a good sharp corner, as well as overcome the elasticity of the stock, so that when pressure is removed the lap will not spring outward. Preferably to reduce friction a roller or disk Y is journaled in a cavity in the mandrel, having a thin periphery which projects slightly above the edge of the mandrel with which the first-folded lap has contact at the corner formed by the folding down of such lap. Mounted in cavities in each side of the mandrel is a series of antifriction-rolls Z and Z, whose peripheries project beyond the bottom of the mandrel in position to engage the bottom portion of the blank and prevent its having sliding contact with the mandrel-bottom during the time the laps are being turned down by the rods X and X.

Figure 3:
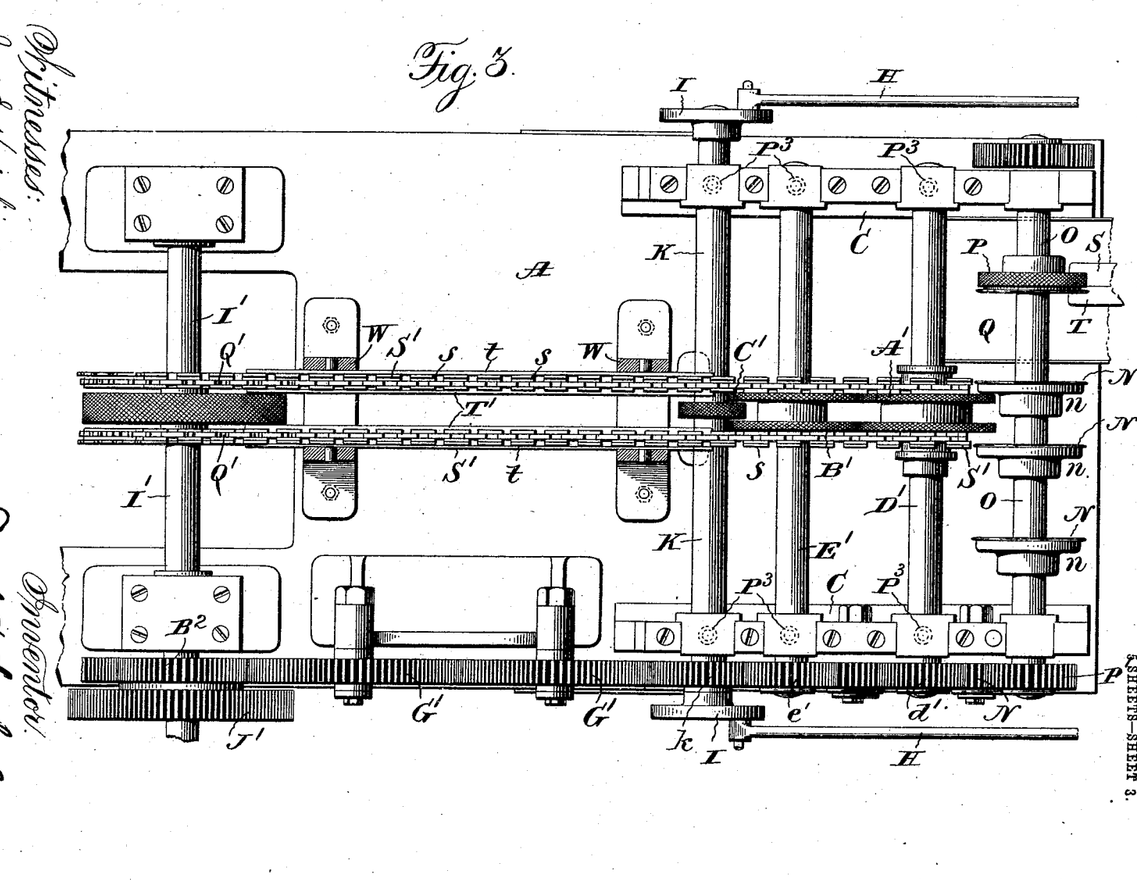
Fig. 3 is a top plan view, on a larger scale, of a portion of the machine with the mandrel or shaper-bar and some other parts omitted.
Figure 4:
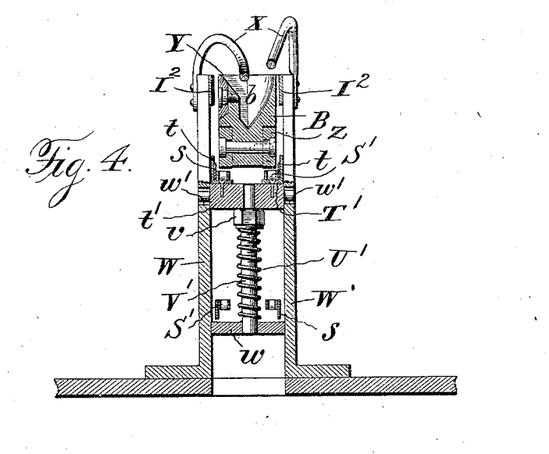
Fig. 4 is a cross-section on the line $x\ x$ of Fig. 1.

Beneath the front portion of the mandrel B is a series of preferably three rolls A', B', and C', the peripheries of which successively engage the under side of the blank and move it along the mandrel. The rolls A' and B' are respectively mounted on shafts D' and E', journaled in bearings on the frame or housing C, and the roll C' is mounted on the shaft K. Each of the rolls has its periphery knurled or roughened, and the rolls A' and B' are formed each with an annular groove, so that each engages the blank at separated points, while the roll C' engages the blank intermediate the portions thereof engaged by the other two, being situated so that it extends partially into the annular groove of the roll B'. Gear-wheels $k$ and $e'$ on the shafts K and E', respectively, mesh with a gear-wheel F' on a stud-shaft $f'$ on the side of the frame C, with which gear meshes one of two intermeshing gears G' and G', the other of which meshes with a gear-wheel H' on a shaft I'. On the latter is a gear-wheel J', meshing with which is a pinion K', connected with a band-wheel L'. Upon the shaft D' is a gear-wheel $d'$, which by means of a gear-wheel M' meshing therewith and with the gear-wheel $e'$ is driven from the latter, and meshing with said gear-wheel $d'$ is a gear-wheel N, which in turn meshes with and transmits power to a gear-wheel O' upon the scorer and glue-wheel shaft O. Said gear-wheel O' meshes with a gear-wheel P' on the scorer-roll M.

Upon the shaft I' there are two sprocket-wheels Q' and Q', and passing therefrom over idler-rolls R' and R' on the shaft D' are two sprocket-chains S' and S'. From the rolls R' and R' the chains pass at a slight incline upward to tracks or rails T' and T' beneath and parallel with the mandrel, by which the chains are caused to bear against the bottom of the folded blank and the mandrel. Said tracks or rails have on their respective outer edges vertical flanges $t$ and $t$, that extend alongside of the mandrel. The tracks or rails are attached to blocks $t'$ and $t'$, placed, respectively, between the two pairs of standards W and W and each pressed yieldingly upward by a spring U', interposed between a cross-bar $w$, attached to the standards, and a nut $v$ on a rod or stem V', to the upper end of which the block is attached. The lower end of the stem plays through a hole in the crosspiece. At the opposite ends of each of the blocks $t'$ are round studs that play in vertically-elongated holes $w$ and $w$ in the respective standards. Each link of each of the chains S' and S' has on its outer side a vertical wing or flange $s$, which flange when the chains pass along the tracks T' and T' project up into the space between the track-flange and the mandrel and engage the sides of the box-shuck being made. It will thus be seen that each chain engages both the bottom and outer side of the shuck. The body portions of the chains being pressed against the box-shuck by the springs has ample friction on the shuck to move the same along the mandrel, and there is some friction between the flanges $s$ and $s$ and the box which aids in the movement of the shuck; but the principal object of the flanges is to keep the sides of the shuck pressed against the mandrel to preserve their shape and make good sharp corners. The chains travel contiguous to that portion of the mandrel in which are mounted the two series of antifriction-rolls Z and Z.

After leaving the sprocket-chains the shuck passes to and over a glue-wheel $w^2$, mounted on a shaft W', journaled in bearings on a frame $x'$, secured to the table A, the wheel being situated so that it applies glue to the middle portion of the bottom of the shuck, the glue being taken by the wheel from a pot Y', which, like the pot Q, has an inclined bottom and rests on the inclined surface of a heater Z'. The glue-wheel is revolved by means of a gear-wheel $w^3$ on its shaft, with which meshes a gear-wheel $A^2$, that is in mesh with a gear-wheel $B^2$ on the main shaft I'. Intermediate the sprocket-chains and the glue-wheel the shucks are moved along the mandrel B by the succeeding shucks pushing onward those in advance.

Beyond the glue-wheel the shuck is engaged on top and bottom by two pairs of rolls $C^2$ $C^2$ and $D^2$ $D^2$, placed, respectively, above and below the mandrel, the former being on a shaft $E^2$ and the latter on a shaft $F^2$, which shafts are journaled in bearings on the frame X'. The peripheries of the lower rolls are preferably knurled. Opposite each roll of a pair is an antifriction-roller $G^2$, mounted in a cavity in the mandrel, and the two lower rolls are separated sufficiently to clear the portion of shuck to which glue is applied. Each of the upper rolls $C^2$ and $C^2$ has on its outer side an annular flange $c$, that laps over the side of the mandrel, and adjacent to such flange is an angular annular depression $c'$ in the roll, opposite which is an angular annular rib $g$ on the outer side of the adjacent roller $G^2$. The two rolls $C^2$ and $C^2$ apply pressure to the laps, and the annular rib-and-groove formation makes the two upper corners of the shuck clean cut and good and sets them. Each of the rolls $C^2$ and $C^2$ is pressed yieldingly toward the mandrel by a coiled spring $H^2$, interposed between the roll and a collar or other part on the shaft, so that it can adapt itself to any irregularities in thickness of the stock and move outward on its shaft to permit the passage of any torn and thickened blanks. Said rolls, of course, are splined to the shaft to permit such movement thereof as may be necessary for the purpose stated.

The sides of the shuck from the point where they are completely folded up against the mandrel by the folder-rods X and X to a point close to the rolls C' and C' are kept in place by thin bars $I^2$ and $I^2$, respectively, on the opposite sides of the mandrel and preferably in position to engage the upper portions of the shuck sides. Said bars $I^2$ and $I^2$ are supported by being fastened to the standards W and W and by brackets $K^2$ and $K^2$ on the frame X', each of the bars having a laterally-projecting stud $i$, which enters an opening in the adjacent bracket, which stud is engaged by a set-screw $L^2$ in a threaded hole in the bracket. The object of the set-screw and stud connection of the bars with their respective brackets is to facilitate adjustment of the bars relative to the mandrel. Besides confining the shuck sides by the bars $I^2$ and $I^2$, the upper side formed by the two laps is held down by an extension of the outside lap-folder rod X, which lies close to and parallel with the top of the mandrel, reaching to a point close to the rolls $C^2$ and $C^2$, where it is supported by a bracket $M^2$, fastened to one of the bars $I^2$ and having a semicircular cavity in its under side in which the rod fits.

Passed along the mandrel by the rolls $C^2$ $C^2$ and $D^2$ $D^2$ the shuck reaches mechanism for applying sand to the glue on its under side, which mechanism, as is usual, comprises a box or receptacle $N^2$ for sand and a wheel $O^2$ therein beneath the mandrel, the periphery of the wheel being formed to catch up the sand and throw it against the glue on the shuck. The sand-wheel $O^2$ is fixed on a shaft $P^2$, having a wheel $Q^2$, which is connected by a crossed belt $R^2$ to a wheel $S^2$ on a stud-shaft $T^2$. A pinion $s'$, connected to said wheel $S^2$, meshes with a gear-wheel $U^2$ on the lower roll-shaft $F^2$, and a pinion $U^3$ on the latter is geared through an idler $V^2$ to a gear-wheel $W^2$ on the glue-wheel shaft. The upper rolls $C^2$ and $C^2$ are revolved by means of a gear-wheel $X^2$ on the shaft $E^2$, that meshes with the gear-wheel $U^2$ on the lower roll-shaft $F^2$. Having received the sand, the shuck may be passed off the mandrel without additional treatment; but as it may sometimes be desirable to subject the laps to pressure the mandrel is provided with a removable extension Z² and one or more sets of rolls. One set is shown, the rolls of which are preferably similar to the rolls C² C² and D² D²—that is to say, there is a pair of rolls A³ and A³ above the mandrel extension to bear the laps against the same, a pair of rolls B³ and B³ below the mandrel to engage the under side of the shuck, and antifriction-rolls C³ and C³, mounted upon the mandrel. The rolls A³ and A³ are mounted on a shaft E³, and the rolls B³ and B³ are on a shaft F³, which shafts are journaled in bearings on a frame G³, that is mounted on a pair of arms or brackets H³ and H³, bolted to the table A. For driving said rolls sprocket-wheels I³ and K³ are placed on the respective shafts E³ and F³, which are connected by a sprocket-chain L³ with a sprocket-wheel M³ on the upper roll-shaft E², the chain being passed over an idler-roll N³ to cause it to properly engage the wheels I³ and K³. The extension Z² may be attached to the mandrel B in any desired way, as by a tenon-and-slot connection and a pin or bolt O³. When supplemental pressing of the shuck is not needed, the mandrel extension is removed. Except for the vertical pin D, which passes through the mandrel B at its front end, there is no positive connection of the mandrel with the machine, and it is supported by simply resting upon the various rolls and the sprocket-chains beneath it. The vertical pin connection is such that limited vertical movement of the mandrel is possible, such being caused by the shucks passing along it. Any rise or lifting of the mandrel is accompanied by a like movement of the sprocket-chains S' and S' beneath it under pressure of the springs V' and V', and to cause the feed-rolls A', B', and C' to likewise rise with the mandrel, so they may not fail to act on the blank, their shaft boxes or bearings are supported on springs P³ and P³, and to permit the rising of the lap-pressing rolls, which are above the mandrel, their shaft boxes or bearings have springs Q³ and Q³.

Having thus described my invention, what I claim is—

1. In a box-machine the combination of a mandrel, angular in cross-section, means for feeding a blank along the same, rods or bars inclined upward and inward from a plane below the bottoms of the mandrel to or near the top of the mandrel, whereby the opposite side portions of the blank are gradually raised and pressed inward against the sides of the mandrel, and other rods or bars extending at different angles inward and downward toward the top of the mandrel, from planes above and laterally of the mandrel whereby said latter rods or bars successively engage the two projecting side portions of the blank and bend them down, one after the other, one of the last-named rods having an extended portion which lies adjacent to and extends in parallelism with the mandrel, thereby maintaining the overlapped edges of the side portions of the blank in close contact during the traverse of the folded blank along the mandrel, substantially as described.

2. In a box-machine, the combination of a mandrel, angular in cross-section, means for feeding a blank along the same, rods or bars whose forward ends are free and are located below the bottom of the mandrel and inclined upward and inward to or near the top of the mandrel, whereby the opposite side portions of the blank are gradually raised and pressed inward against the sides of the mandrel, a support for the upper ends of said rods or bars, and other rods or bars secured to said support and inclined at different angles inward and downward to the top of the mandrel from planes above and laterally of the mandrel, whereby said latter rods or bars successively engage the two projecting side portions of the blank and bend them down, one after the other, to the top of the mandrel, one of the last-named rods having an extended portion which lies adjacent to and extends in parallelism with the mandrel, thereby maintaining the overlapped edges of the side portions of the blank in close contact during the traverse of the folded blank along the mandrel, substantially as described.

3. In a box-machine, the combination of a mandrel, angular in cross-section, provided in its upper side for a portion of its length with a recess or cavity having a thin-edged wall, means for feeding a blank along said mandrel, rods or bars inclined upward and inward from a plane below the mandrel to or near the top of the mandrel, whereby the opposite side portions of the blank are gradually raised and pressed inward against the sides of the mandrel, and other rods or bars extending at different angles inward and downward toward said cavity from planes above and laterally of the mandrel, whereby said latter rods or bars successively engage the two projecting side portions of the blank and bend them down, one after the other, one of said latter rods or bars being arranged to press the first bent lap slightly down into the cavity, substantially as described.

4. In a box-machine, the combination of a mandrel, angular in cross-section, provided in its upper side for a portion of its length with a recess or cavity having a thin-edged wall, means for feeding a blank along said mandrel, rods or bars inclined upward and inward from a plane below the mandrel to or near the top of the mandrel, whereby the opposite side portions of the blank are gradually raised and pressed inward against the sides of the mandrel, and other rods or bars extending at different angles inward and downward toward said cavity from planes above and laterally of the mandrel, whereby said latter rods or bars engage the two projecting side portions of the blank and bend them down, one after the other, one of said latter rods or bars being arranged to press the first bent lap slightly down into the cavity, and the other rod or bar being extended beyond the said cavity and close to and parallel with the top of the mandrel, substantially as described.

5. In a box-machine, the combination of blank-folding means, a mandrel having a cavity or opening opposite the latter for a portion of its length, one wall of said cavity having a thin edge over which a part of the blank is folded, and means for partially depressing laps of the blank into the cavity, the laps being folded over each other and being supported by the mandrel beyond the cavity, substantially as described.

6. In a box-machine, the combination of folding means for folding portions of a blank to overlap each other, a mandrel having for a portion of its length a cavity with a thin edge over which one of the portions is folded, the overlapped portions of the blank being supported by the mandrel beyond said thin edge, substantially as described.

7. In a box-machine, the combination of folding means and a mandrel having a cavity with a movable thin edge over which the blank is folded, substantially as described.

8. In a box-machine, the combination of folding means, and a mandrel having a cavity or opening opposite the folding means, a roller with a thin blank-engaging periphery at the side of the cavity or opening over which the blank is folded, substantially as described.

9. In a box-machine, the combination of a mandrel, a blank-feeder adapted to feed a single blank at a time, blank-scoring means, and blank-folding means, said mandrel having formed therein opposite the folding means a cavity with a thin edge over which a portion of the blank is folded, substantially as described.

10. In a box-machine, the combination of a mandrel, having for a portion of its length a cavity with a thin edge over which a portion of the blank is folded, blank-folding means, rotary scorers between which the blank is passed and from which it is directly delivered to the mandrel, and means for feeding complete blanks to the scorers, substantially as described.

11. In a box-machine, the combination of a mandrel and a chain or belt contiguous thereto, having surfaces to engage two sides of the box being formed, substantially as described.

12. In a box-machine, the combination of a mandrel, means for folding a box thereon, a chain or belt contiguous thereto between which and the mandrel the box being formed passes, said chain or belt having surfaces to engage two opposite sides of the box being formed, and a supporting track or rail for said chain or belt, substantially as described.

13. In a box-machine, the combination of a mandrel angular in cross-section, means for folding a blank about the mandrel, chains each having opposite two sides of the mandrel surfaces which engage said blank, and supporting tracks or rails for the chains, substantially as described.

14. In a box-machine, the combination of a mandrel, means for folding a box thereon, traveling box-engaging surfaces to engage two sides of the box being formed, a track or rail therefor, standards on opposite sides of the track or rail, and coil-springs between the standards, substantially as described.

15. In a box-machine, the combination of a mandrel, chains or belts contiguous thereto, between which and the mandrel the box being formed passes, said chains or belts being each constructed to engage two sides of the box being formed, tracks or rails for said chains, and coiled springs supporting said tracks or rails, substantially as described.

16. In a box-machine, the combination of a mandrel, rotary scorers, folder-rods, rolls beneath the forward portion of the mandrel, belts or chains beneath the mandrel rearwardly of said rolls, tracks or rails for said belts or chains, a series of rolls located within cavities in the mandrel so as to extend slightly below the same to coact with said belts or chains, and means for yieldingly supporting said tracks or rails, substantially as described.

17. In a box-machine, the combination of a mandrel, folding means, and a pair of coöperating lap-pressing rolls having, respectively, a rib and a groove that act on the lap adjacent to the corner formed by the fold thereof, substantially as described.

18. In a box-machine, the combination of a mandrel, a removable extension at one end thereof, box-forming means, including means for folding a blank about the mandrel, means for applying glue to the lap or laps of the blank, and lap-pressing rolls, coöperating with said mandrel, lap-pressing rolls coacting with said extension, and means for actuating the respective rolls concertedly, the said extension being removable independently of its lap-pressing rolls and their actuating means, substantially as described.

19. In a box-machine, the combination of a mandrel, a removable extension at one end thereof, box-forming means, including means for folding a blank about the mandrel, means for applying glue to the lap or laps of the blank, and a set of lap-pressing rolls, coacting with said mandrel, a set of lap-pressing rolls coacting with said extension, and sprocket-gearing between the drive-shafts for the respective sets of rolls, the said extension being removable independently of its lap-pressing rolls and the said gearing, substantially as described.

In testimony that I claim the foregoing I have hereunto set my hand this 11th day of June, A. D. 1900.

JACOB P. WRIGHT.

Witnesses:
   B. C. Ross,
   J. A. Baughman.